United States Patent [19]
Takaoka et al.

[11] Patent Number: 5,438,648
[45] Date of Patent: Aug. 1, 1995

[54] IMAGE INTERFACE DEVICE

[75] Inventors: Makoto Takaoka, Kawasaki; Shigetada Kobayashi, Yokohama, both of Japan

[73] Assignee: Canon Kabushiki Kaisha, Tokyo, Japan

[21] Appl. No.: 324,457

[22] Filed: Oct. 17, 1994

Related U.S. Application Data

[63] Continuation of Ser. No. 790,501, Nov. 12, 1991, abandoned.

[30] Foreign Application Priority Data

Nov. 16, 1990 [JP] Japan ................. 2-308494

[51] Int. Cl.⁶ ............................... G06F 15/00
[52] U.S. Cl. ..................... 395/106; 395/114; 395/112
[58] Field of Search ............. 395/117, 106, 114, 112, 395/109; 346/154, 157; 358/296, 298, 540, 462, 450

[56] References Cited

U.S. PATENT DOCUMENTS

| | | | |
|---|---|---|---|
| 4,682,190 | 7/1987 | Ikeda | 346/154 |
| 4,860,026 | 8/1989 | Matsumoto et al. | 346/1.1 |
| 4,905,097 | 2/1990 | Watanabe et al. | 358/456 |
| 4,989,163 | 1/1991 | Kawamata | 395/112 |
| 5,038,298 | 8/1991 | Matsumoto et al. | 364/518 |
| 5,060,059 | 10/1991 | Mori et al. | 358/79 |

FOREIGN PATENT DOCUMENTS

| | | |
|---|---|---|
| 205010 | 12/1986 | European Pat. Off. |
| 262801 | 4/1988 | European Pat. Off. |
| 336403 | 10/1989 | European Pat. Off. |
| 371005 | 5/1990 | European Pat. Off. |

OTHER PUBLICATIONS

Patent Abstracts of Japan, vol. 12, No. 177 (E-613) (Kokai 62-284573).

*Primary Examiner*—Arthur G. Evans
*Attorney, Agent, or Firm*—Fitzpatrick, Cella, Harper & Scinto

[57] ABSTRACT

Disclosed is an image interface device connected to a so-called digital copying machine for inputting from and outputting to an external unit, such as a computer system or a communication unit, both multilevel and binary image data. The digital copying machine performs various image processings on the image data output from a scanner for photoelectrically reading an image using a CCD or the like and supplies the processed image data to a printer, such as an ink jet printer, for printing. When the image data is input from the digital copying machine, the multilevel or binary data combined by a multilevel and binary data separating/combining circuit is input through the same data bus controlled by an I/F control circuit. When the multilevel or binary image data is output to the digital copying machine, the data is output through the same data bus, as in the case of inputting the image data. That is, when the multilevel image data is to be output, it is sent from the I/F control circuit to the multilevel and binary data separating/combining circuit and is output as multilevel image data. When the binary image data is to be output, it is output from the multilevel and binary data separating/combining circuit as binary image data.

15 Claims, 17 Drawing Sheets

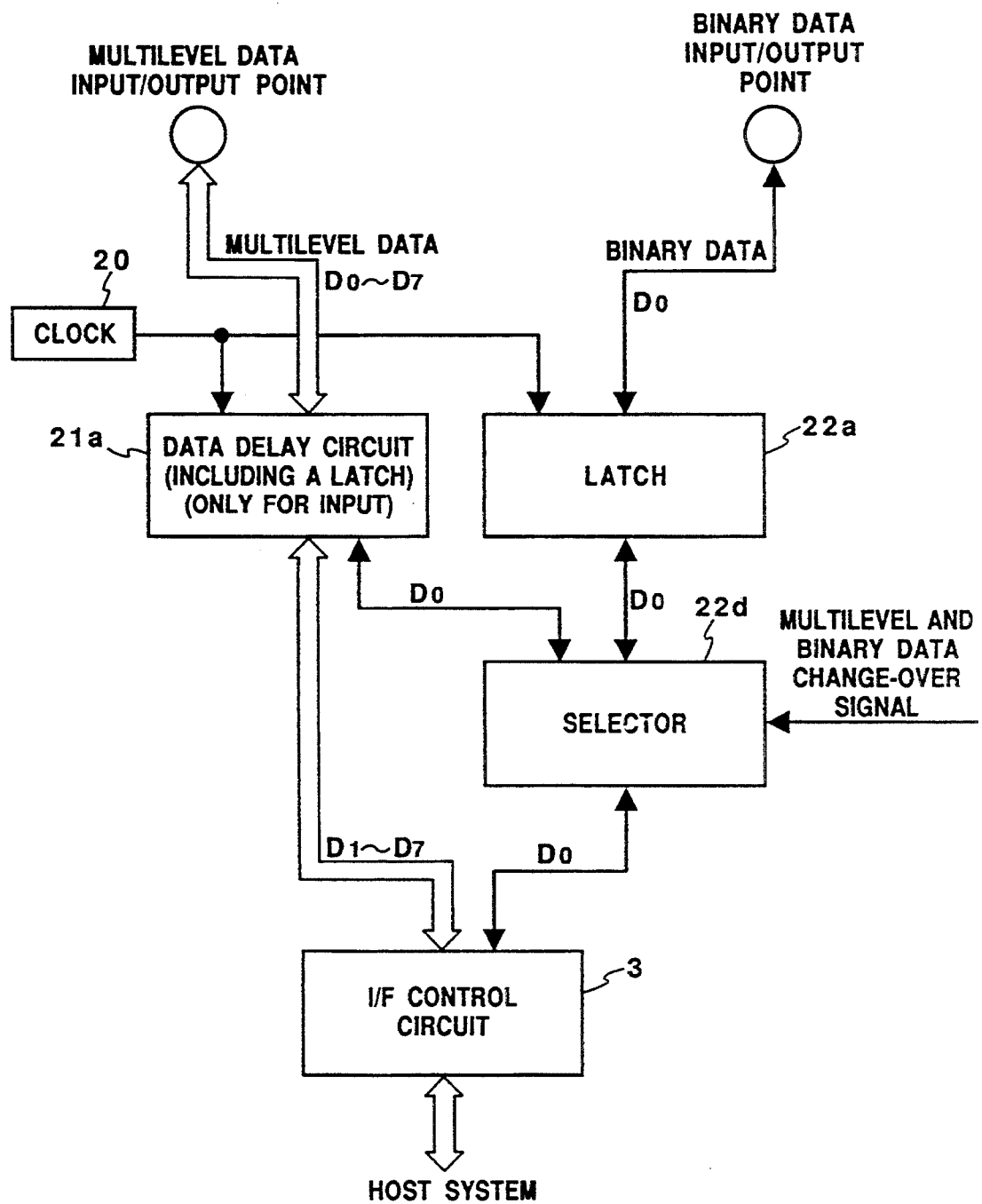
F I G. 11

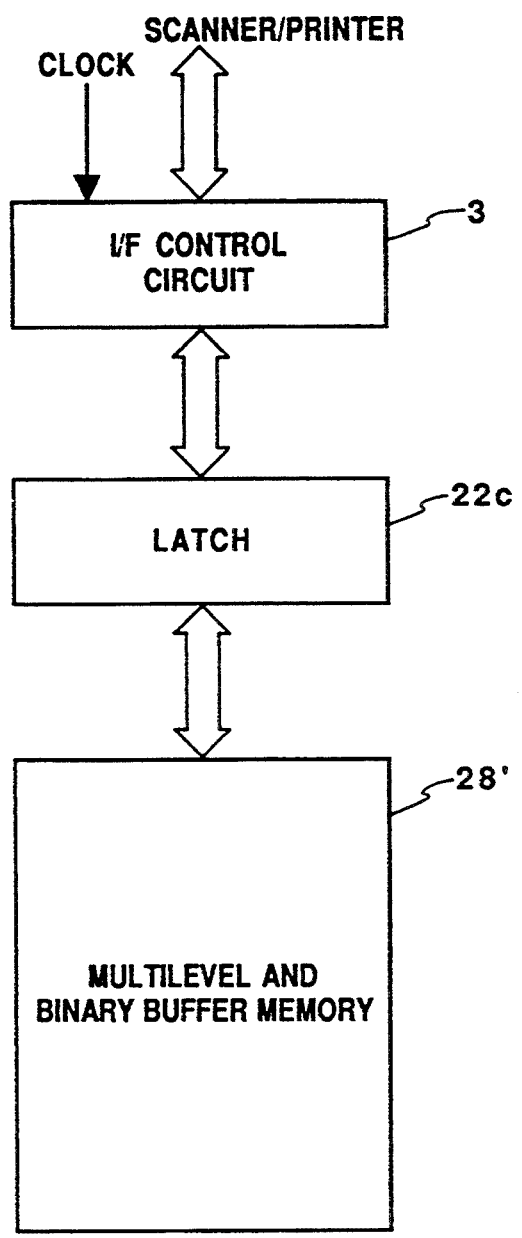
F I G. 12

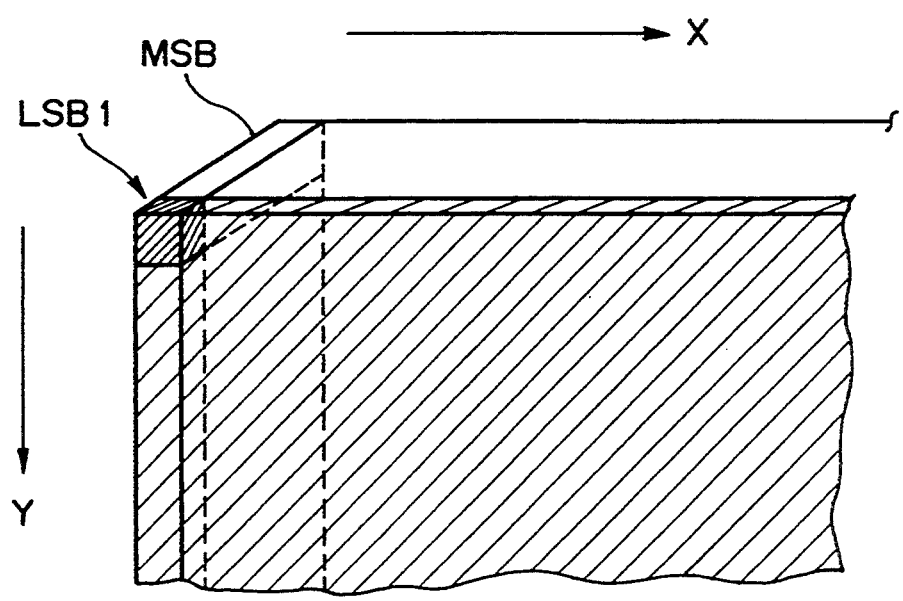
F I G. 15

IMAGE INTERFACE DEVICE

This application is a continuation of application Ser. No. 07/790,501, filed Nov. 12, 1991, now abandoned.

BACKGROUND OF THE INVENTION

1. Field of the Invention

The present invention relates to an image interface device which is capable of processing multi-level image data (one pixel per n bits for example, eight bits) and binary image data (one pixel per one bit) through the same data bus when necessary image processings are conducted on the image input from a scanner and the resultant image is then outputted to a printer.

2. Description of the Related Art

In conventional digital copying machines, various types of image processings are conducted on the image data output from a scanner for photoelectrically reading images using a CCD or the like, and the resultant image data is supplied to a printer, such as an ink jet printer, for printing.

In such digital copying machines, the scanner reads images in the form of multilevel data of n bits per pixel and thereby reads halftones of an original, and outputs the multilevel image data read to a subsequent processing unit. When a printer of the type in which images are reproduced by the presence and absence of dots, for example, an ink jet, is used, the multilevel image data on which various image processings are conducted is converted into binary data of one bit per pixel and then supplied to the printer.

Thus, multilevel data is output from the scanner, and binary data is supplied to the printer.

It has also been proposed to connect an external unit, such as a computer system or a communication unit, to the digital copying machine and thereby use the digital copying machine as an input device for inputting image data to the external unit or as an output device for outputting image data from the external unit.

How the digital copying machine and the external unit are connected with each other is determined by the type of image data the external unit handles, i.e., depending on whether it is multilevel or binary.

Hence, the type of connectable external unit is limited if only either the binary or multilevel image data is handled by the interfacing device which provides interface between the external unit and the digital copying machine.

Furthermore, if interfaces for both the binary and multilevel image data are provided to handle both kinds of data, the configuration of the device becomes complicated. If only one type of data is handled in such a device, the function and configuration for the other type of data is wasted.

SUMMARY OF THE INVENTION

In view of the aforementioned problems of the conventional techniques, an object of the present invention is to provide an image interface device which can be used commonly for both multilevel and binary image data and which has a simple configuration.

Another object of the present invention is to provide an image interface device which is capable of inputting and outputting both binary and multilevel image data between, for example, a digital copying machine and an external unit.

Another object of the present invention is to provide an image interface device which is capable of inputting and outputting both binary and multilevel image data and which has a simple structure.

Other objects of this invention will become clear from the following description of the preferred embodiments with reference to the accompanying drawings.

BRIEF DESCRIPTION OF THE DRAWINGS

FIG. 11 is a block diagram of a multilevel and binary data combining/separating circuit of FIGS. 10A and 10B;

FIG. 12 is a block diagram of a multilevel and binary data memory of FIGS. 10A and 10B;

FIG. 15 shows the area in the multilevel buffer memory which is occupied by the binary data.

DETAILED DESCRIPTION OF THE PREFERRED EMBODIMENTS

A first embodiment of the present invention will be described below with reference to the accompanying drawings.

Figure 2:
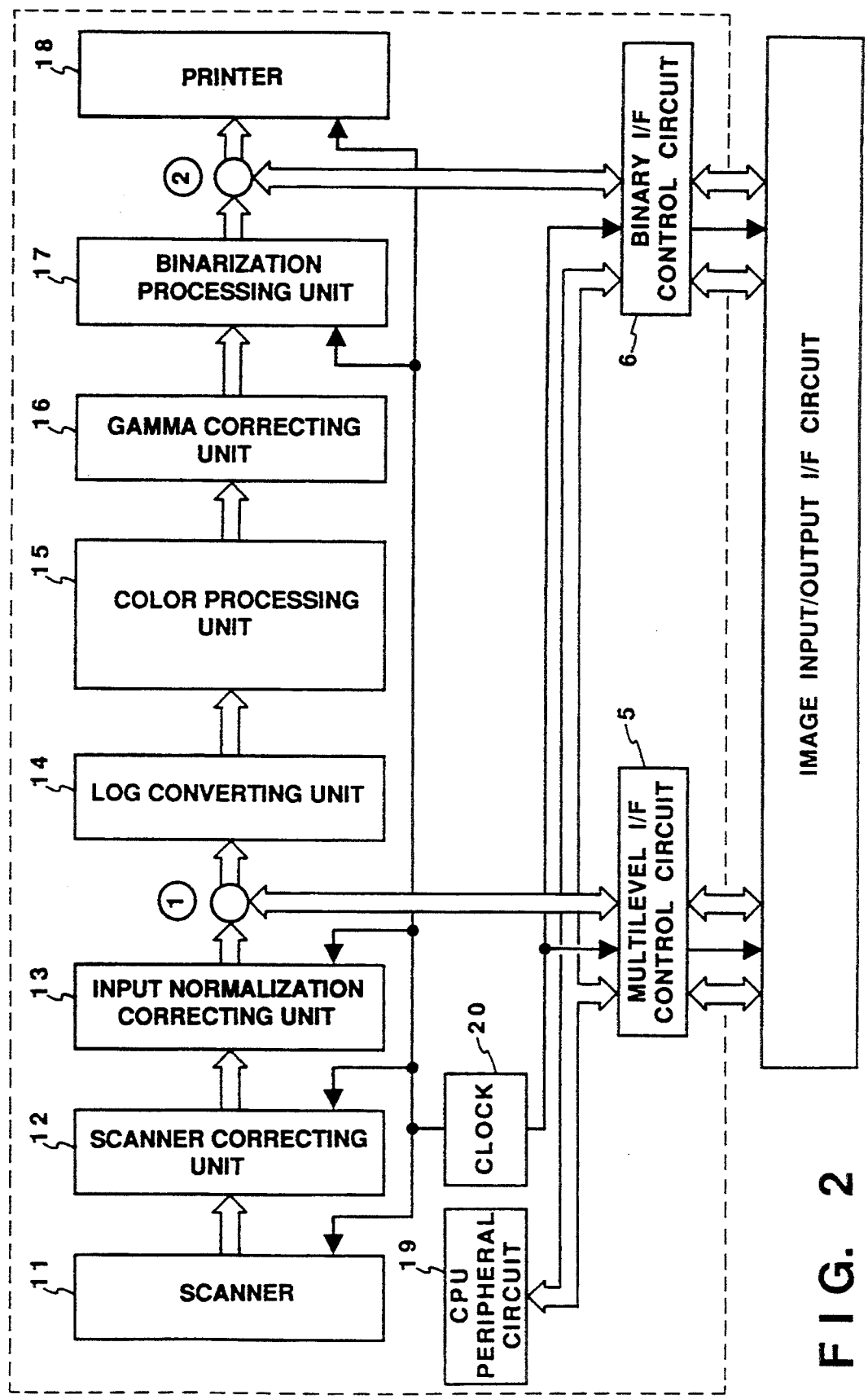
FIG. 2 shows an interface with a scanner/printer in the first embodiment.

Devices of the type which conduct various types of image processings on image data read from a scanner and outputs the resultant image data to a printer for printing, i.e., so-called digital copying machines, generally have the configuration surrounded by a broken line in FIG. 2. Multilevel and binary data can be obtained through interfaces from points indicated by ① and ② in FIG. 2, respectively.

In such devices, a large amount of image data is handled, and a memory having a large capacity is thus required. Hence, such devices adopt the pipelined architecture in which image reading and printing are synchronized with each other in order to save the memory capacity.

FIG. 2 is a block diagram of a device in which the scanner and the printer are provided as one device. A scanner/printer will be described below in detail with reference to FIG. 2.

First, a color original document is optically read by scanner 11 which employs, as a reading sensor, an optical sensor, such as a CCD. The signal read by the sensor is an analog signal and hence requires correction of variations by the sensor, color characteristics or dark and bright range. Therefore, the analog signal read by the sensor is converted into a digital signal and shading correction is then conducted on the digital signal by a scanner correcting unit 12.

The data output from the scanner correcting unit 12 is RGB data each in eight bits which is obtained according to the characteristics of the scanner. Hence, the data is corrected to standard color image data by a input normalization correcting unit 13. Generally, the data is normalized such that it meets the requirements of the RGB data employed in the NTSC method. In this method, the following calculation is conducted using the matrix operation of $3 \times 3$.

$$\begin{pmatrix} RNTSC \\ GNTSC \\ BNTSC \end{pmatrix} = \begin{pmatrix} a11 & a12 & a13 \\ a21 & a22 & a23 \\ a31 & a32 & a33 \end{pmatrix} \begin{pmatrix} R \\ G \\ B \end{pmatrix}$$

where $a_{nm}$ is a parameter determined by the characteristics of the scanner employed.

Thus, at the point ① where color correction on the scanner side is completed, the standard RGB multilevel image data can be obtained.

Next, conversion from luminance to tone is conducted by LOG converting unit 14 because the RGB multilevel image data is luminance data while the data used in the printer is YMCBk type tone data.

Consequently, R, G and B in the RGB data are respectively converted into C, M and Y data. Thereafter, the converted multilevel color image data CMY is sent to color processing unit 15 which conducts black generation, under color removal and masking. Black generation is to replace common data in the CMY data with black data and is conducted as follows:

$$Bk = \min(C, M, Y)$$

Under color removal is to remove from the color data CMY, the block value obtained by the aforementioned black generation, and thereby replace the black data formed by overlapping the CMY data with the Bk formed by the black ink.

$$C' = C - k_1 \cdot Bk$$

$$M' = M - k_2 \cdot Bk$$

$$Y' = Y - k_3 \cdot Bk$$

where $k_1$, $k_2$ and $k_3$ are respectively parameters which determine the percentage of the UCR.

Masking is to correct the obtained CMYBk multilevel image data into CMYBk multilevel image data which satisfies the characteristics of the printer. The most commonly practiced primary masking is conducted as follows:

$$\begin{pmatrix} CP \\ MP \\ YP \\ KP \end{pmatrix} = \begin{pmatrix} b11 & b12 & b13 & b14 \\ b21 & b22 & b23 & b24 \\ b31 & b32 & b33 & b34 \\ b41 & b42 & b43 & b44 \end{pmatrix} \begin{pmatrix} C' \\ M' \\ Y' \\ Bk \end{pmatrix}$$

where $b_{nm}$ is the parameter determined by the characteristics of the printer used.

The processing conducted by the color processing unit 15 is not limited to the aforementioned processing. Various other color processing algorithms are known.

The CP MP YP BkP multilevel image data obtained by the color processing unit 15 is transferred to a gamma correcting unit 16 which generally performs data conversion using the look up table (LUT) to obtain data according to various gamma curves.

$$CP' = f(CP)$$

$$tMP' = f(MP)$$

$$YP' = f(YP)$$

$$BkP' = f(BkP)$$

The gamma correction made in the gamma correcting unit 16 is adjusted depending on the printed matter output from the printer. For example, if it is desired to make magenta on the printed matter deeper, gamma correction is conducted on magenta.

The image data remains multi level data (having n bits, for example, eight bits) until it passes through the gamma correcting unit 16.

In this processing system, color printing is conducted. Since color printing is conducted in the above-described processing system using a non-impact type color ink jet printer as the recording device, printing is conducted by a combination of the presence and absence of a dot. Hence, the multilevel data must be converted into binary data. This is accomplished by a binarization processing unit 17.

Even if a heat sublimation or thermal transfer type recording device is used, this conversion of multilevel data of n bits into data of m bits must be conducted.

The binarization processing unit 17 generally converts the 8-bit data into 1-bit data by the dither or error diffusion method. Consequently, binary data is obtained at the point indicated by ② in FIG. 2. The binary data is sent to a printer 18.

The data processing system in which the scanner and the printer are incorporated as one unit has been described with reference to FIG. 2. This processing system generally adopts the pipelined architecture because it needs not to have an internal memory, as stated above.

Hence, in such a data processing system, the image data obtained by the scanner portion is transferred to the image processing system in sequence, and the processed image data is sent to the printer using the same clock after it is delayed by several clocks. In other words, the operation of the reading sensor of the scanner portion is synchronized with that of the printing head of the printer.

When input and output of image data are conducted between such a synchronous scanner/printer and an external unit, the interface unit must conduct input and output of data using the same clock as that used in the scanner printer.

Figure 3:
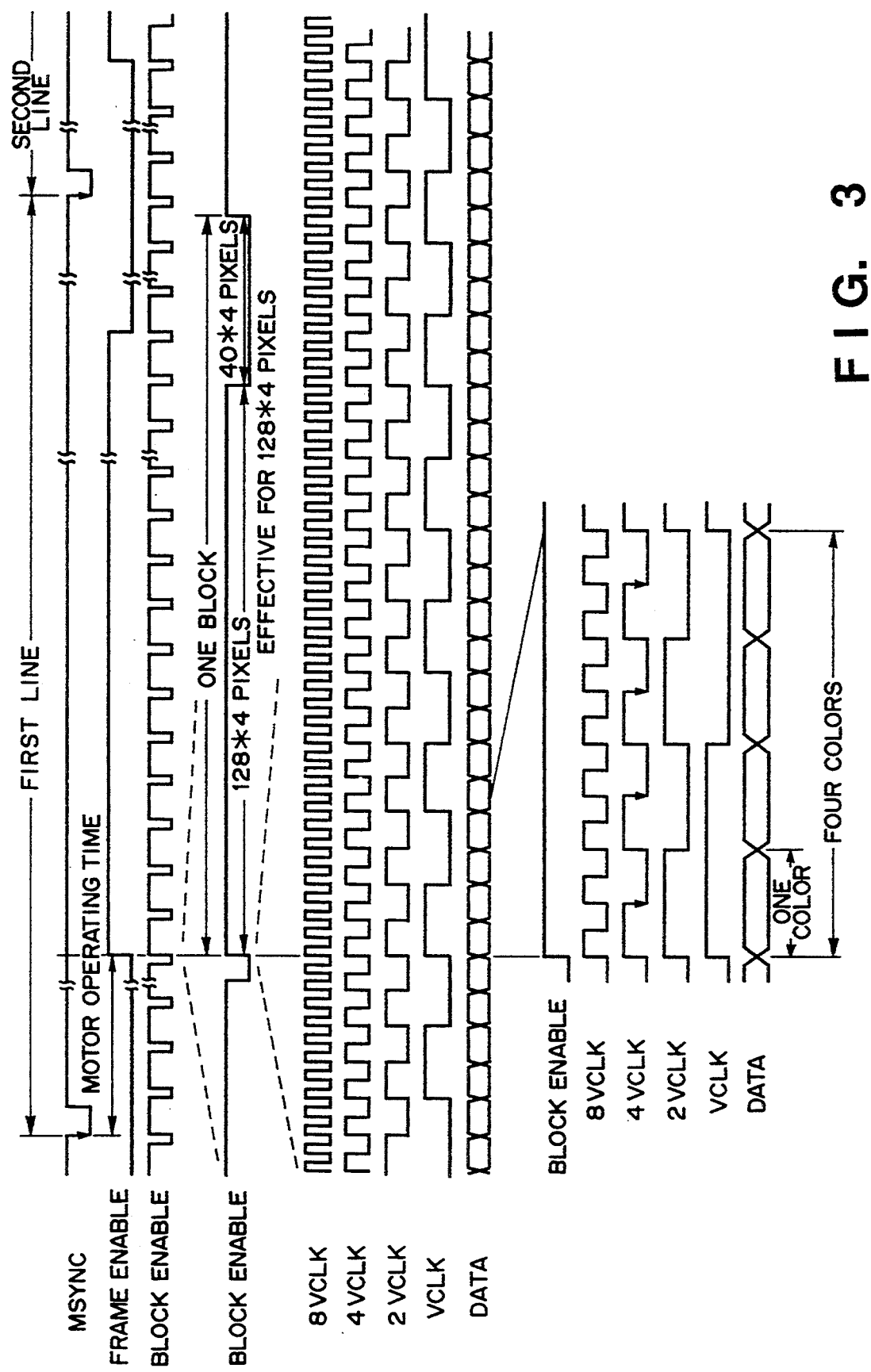
FIG. 3 is a timing chart of a video interface.

Interface (I/F) for conducting input and output of the image data may be a video I/F. FIG. 3 shows the timing of the operation of the video I/F.

Figure 4:
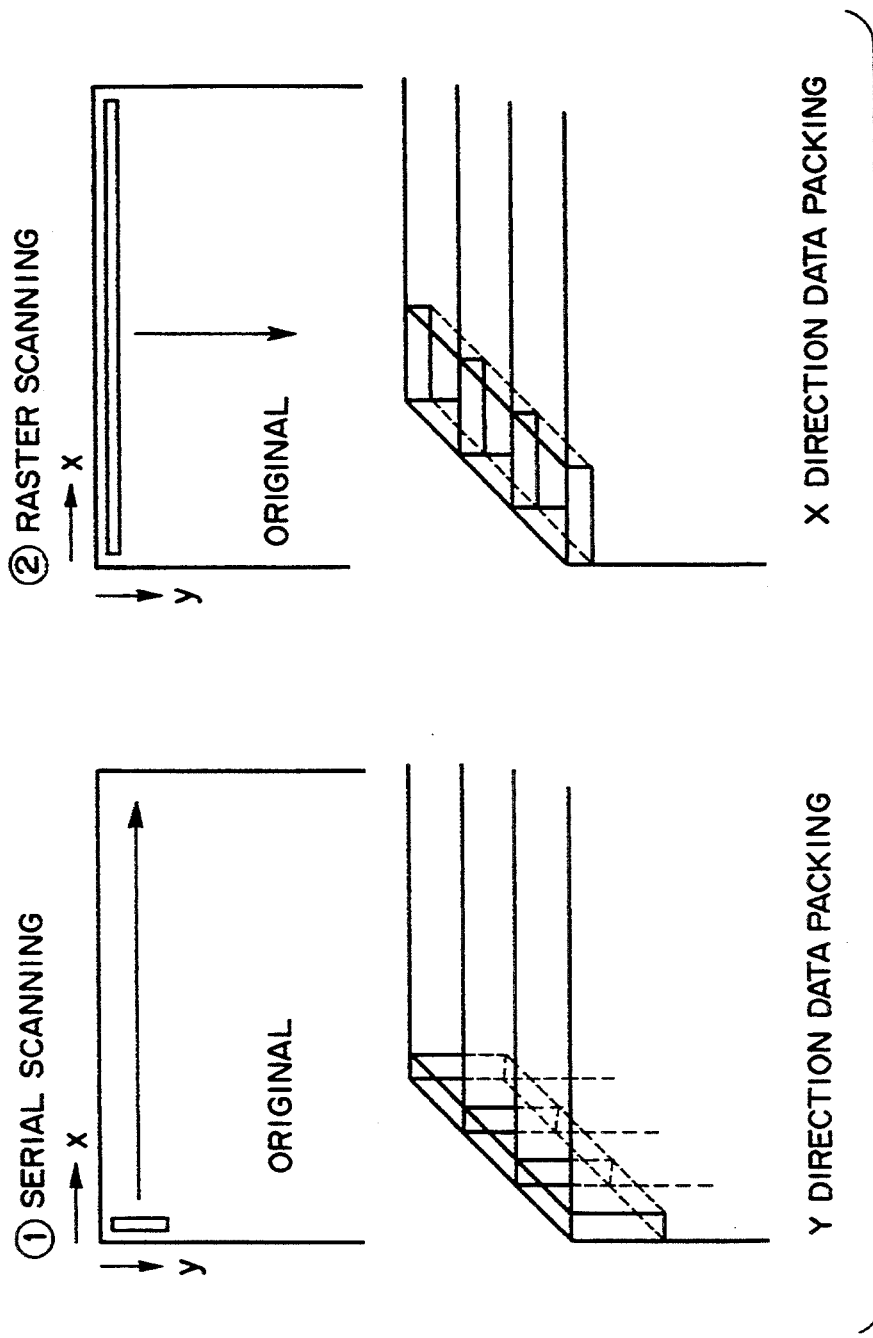
FIG. 4 illustrates the direction of scanning and the byte packing of binary data.

The timing chart shown in FIG. 3 is that for the serial scanning type scanner shown in FIG. 4 ①, which is slightly different from that for the raster scanning type scanner shown in FIG. 4 ②. Description of the timing for the raster scanning method is omitted.

In FIG. 3, MSYNC indicates a motor starting signal for moving the reading sensor of the scanner in the x direction. All the operations are initiated using this motor starting signal as a reference. Frame Enable is enabled only when the sensor is moving in the x direction. Image data is obtained only when this Frame Enable is enabled.

Block Enable is enabled for a period of time corresponding to the time it takes for the sensor to move in the y direction. In the example shown in FIG. 3, Block Enable contains 128 pixels. In other words, image data of 128 pixels is obtained after Block Enable is enabled.

The relationship between the clock and the image data will be described below.

When input and output of image data between the aforementioned synchronized type scanner/printer and the external unit are conducted, input and output of data must be conducted using the aforementioned synchronizing type I/F, such as a video I/F.

Hence, the computer system or communication control device connected to the scanner/printer for controlling input and output of image data includes a multilevel I/F control circuit 5 for supplying and receiving multilevel image data at the point ① shown in FIG. 2, and a binary I/F control circuit 6 for supplying and receiving binary image data at the point ② shown in FIG. 2.

The frequency with which these I/F control circuits 5 and 6 are desired depends on which type of image data is required. If data representing images close to that of the original is desired, the multilevel I/F 5 is used. However, since the use of the multilevel I/F 5 increases the amount of image data to be handled greatly, image data of the binary I/F 6 is also used often because the amount of data for the binary I/F 6 is one nth (for example, one eighth) of the multilevel data. Consequently, the multilevel I/F 5 and the binary I/F 6 are provided independently.

Recently, in a device for communicating images, such as a color facsimile, there has been an increasing demand for the binary data output from the point ②, because the development of the error diffusion method or average density preserving method, which is the density preserving type binarization method, have progressed and the technology for restoring multilevel data from the binary data have therefore been established. Consequently, both the multilevel and binary I/Fs are required and installed.

However, in this embodiment, provision of both the multilevel and binary I/Fs makes the configuration of the circuit complicated, and part of the two I/F systems is not used. Furthermore, since the point at which input and output of multilevel data are conducted differs from the point at which input and output of binary data are performed, it is difficult to use the same I/F for both multilevel and binary image data.

A common image interface device which can be used as the multilevel and binary I/Fs will be described below.

Before description of the embodiment is given, the basis on which the common interface can be provided will be described first.

In the timing chart shown in FIG. 3, the data handled by the multilevel I/F is the same as that handled by the binary I/F with the exception that the former has eight bits while the latter is one bit. However, consideration must be given to the fact that the data handled by the binary I/F at a single time is delayed by several data, compared to the data handled by the multilevel I/F due to the pipelined processing.

As is clear from the point ① of the multilevel I/F control circuit 5 and the point ② of the binary I/F control circuit 6 of the scanner/printer shown in FIG. 2, delay of data occurs in the binary I/F because a predetermined amount of image processing must be conducted on the data.

However, this delay can be overcome by providing a delay circuit for delaying data by the same period of time as that which occurs in the binary I/F in the multilevel I/F control circuit 5 to synchronize the operation of the multilevel I/F control circuit 5 with that of the binary I/F control circuit 6.

Figure 1:
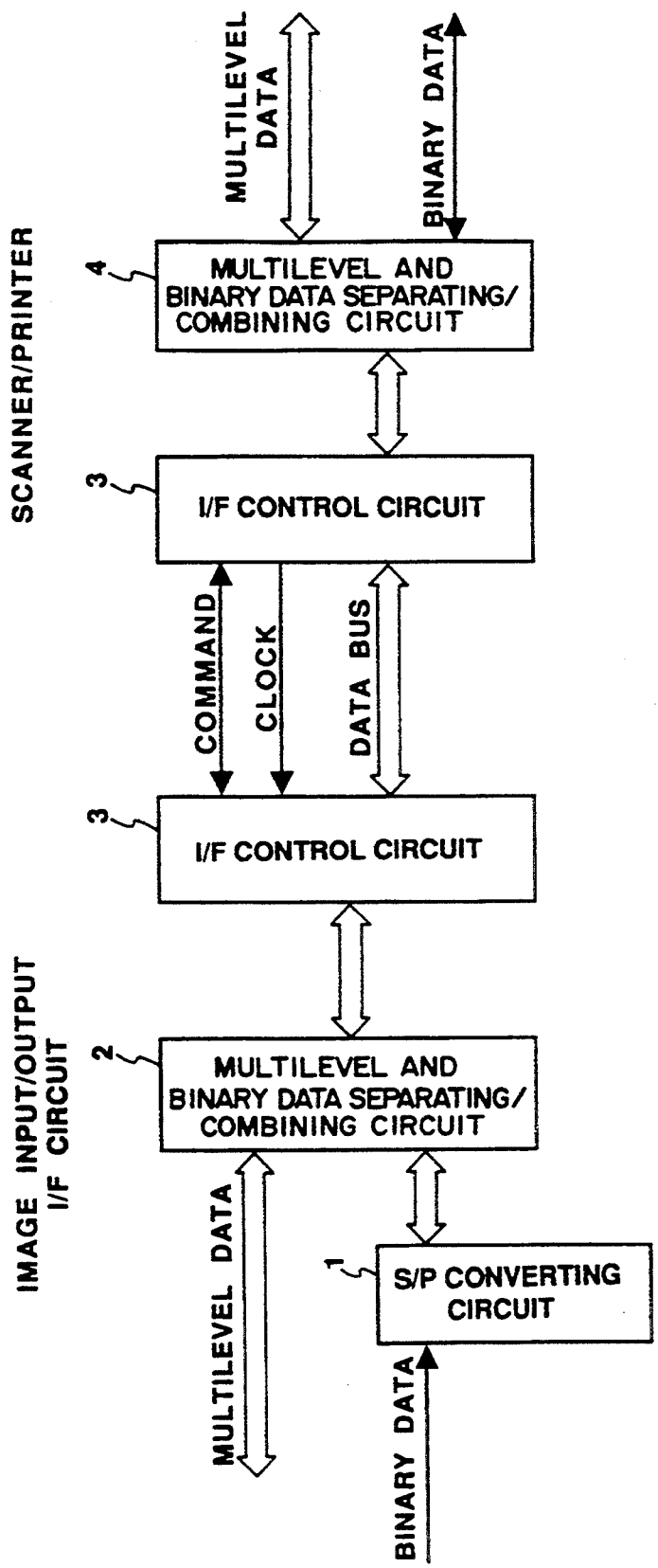
FIG. 1 is a block diagram of a first embodiment of an image interface device according to the present invention.

FIG. 1 is a block diagram of a first embodiment of an image interface device according to the present invention. In FIG. 1, the right half represents the scanner/printer, and the left half shows the I/F circuit of a host system connected to the scanner/printer. On the side of the scanner/printer, a multilevel and binary data separating/combining circuit 4 is provided.

The circuit 4 controls the data route at the multilevel image data input/output point ① and the binary image data input/output point ② shown in FIG. 5, and makes the multilevel and binary data the same image data bus. The configuration of this multilevel and binary data separating/combining circuit 4 will be described below with reference to FIG. 6.

First, data delay circuit 21 adjusts data delay between the multilevel data and the binary data caused by the pipelined processing, and thus inputs the multilevel and binary data received from the scanner to a selector 22b, which will be described layer, as the data of the same pixel. The selector 22b makes a selection between the multilevel and binary data by a multilevel and binary data change-over signal.

Whereas the multi level data bus D0 to D7 is an 8-bit data bus, the binary data bus D0 is a 1-bit data bus. Therefore, the least significant bit of the bus to the I/F control circuit 3 is also used as the binary data bus. In other words, the binary data bus is sensed by sensing only the D0 bit of the multilevel data bus. The multilevel/binary data change-over signal is output to the selector 22b from a CPU 19.

Next, the I/F control circuit 3 controls input/output of the multilevel or binary data between the host system and the scanner/printer through the aforementioned common bus. Practically, the I/F control circuit 3 controls exchange of commands and transmission of the clock generated in the scanner to the host system.

On the side of the host system, the I/F control circuit 3, a multilevel and binary data combining/separating circuit 2 and a serial/parallel converting unit 1 are provided, as in the case of the side of the scanner/printer (see FIG. 1).

Figure 7:
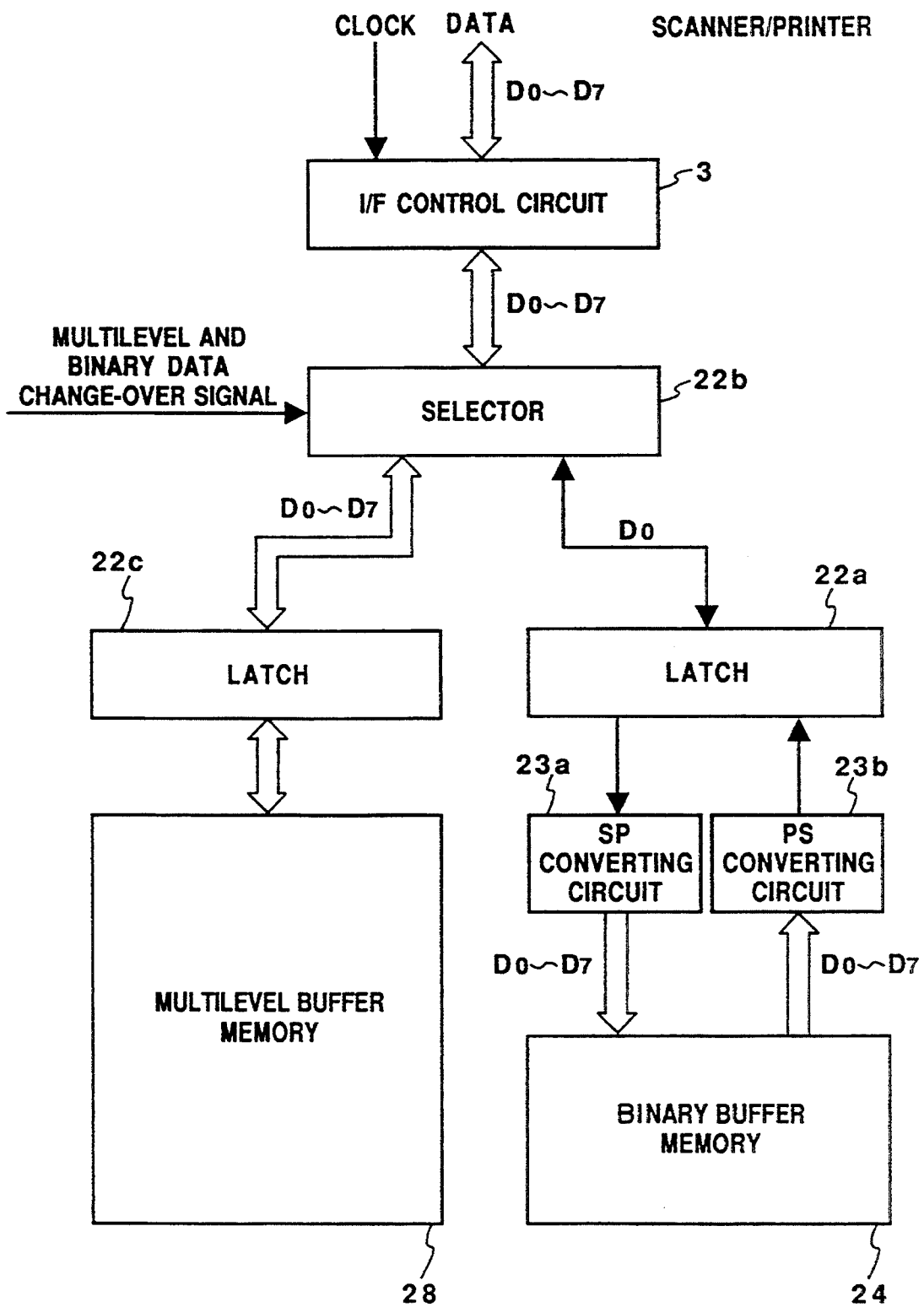
FIG. 7 is a block diagram of a multilevel and binary data separating/combining circuit 2 of FIGS. 5A and 5B.

FIG. 7 shows the detailed configuration of the host system. First, the case in which the image data is input from the scanner will be described.

As shown in FIG. 7, both the multi level and binary data are input to the I/F control circuit 3 through the same data bus. A selector 22b sends 8-bit data to a latch 22c when the multilevel data is selected by the multilevel/binary data change-over signal, and sends 1-bit data to a latch 22a when the binary data is selected. The latch 22a latches the least significant bit alone as the effective binary image data.

In other words, the multilevel data passes through the selector 22b and the latch 22c and is then stored in a memory 28 before transferred to another circuit. The binary data passes through the selector 22b, the latch 22a and then a SP converting circuit 22a and is then stored in a binary memory 24 before transferred to another circuit.

The SP converting circuit 23a converts the serial 1-bit binary image data held in the latch 22a into an 8-bit parallel image data so that the data can be stored in the memory.

Next is the case in which the image data is outputted to the printer. It is assumed that the multilevel data has been transferred to the multilevel memory 28 from an other system (which may be a DISK) and stored. In this case, the image data is sequentially read out from the multilevel memory 28 and is sent through the latch 22c to the selector 22b which is already changed over to the multilevel data route, in contrast to the case in which the image data is input. Thereafter, the multilevel data is sent to the scanner/printer through the I/F control circuit 3. At that time, the multilevel image data is sent to point ① shown in FIG. 5 and is then pipeline processed. The processed data is outputted from the printer.

The timing in which data is outputted from the side of the host system is the same as that shown in FIG. 3, which is the same as the above-described timing in which data is inputted to the side of the host system.

To maintain the scanner/printer and the host system synchronized with each other, the clock supplied from the scanner/printer is used without change in the side of the host system. This clock is also used for the pipeline processing at the point ① shown in FIG. 5.

The binary image data stored in the binary memory 24 is read out from the memory in sequence, and is sent to a parallel-in serial-out P/S converting circuit 23b which converts the byte packed binary image data into serial data. The obtained serial data is latched in the latch 22a and is then sent to the scanner/printer through the selector 22b and the I/F control circuit 3. This processing is the same as that conducted when the multilevel image data is output.

Figure 5A:
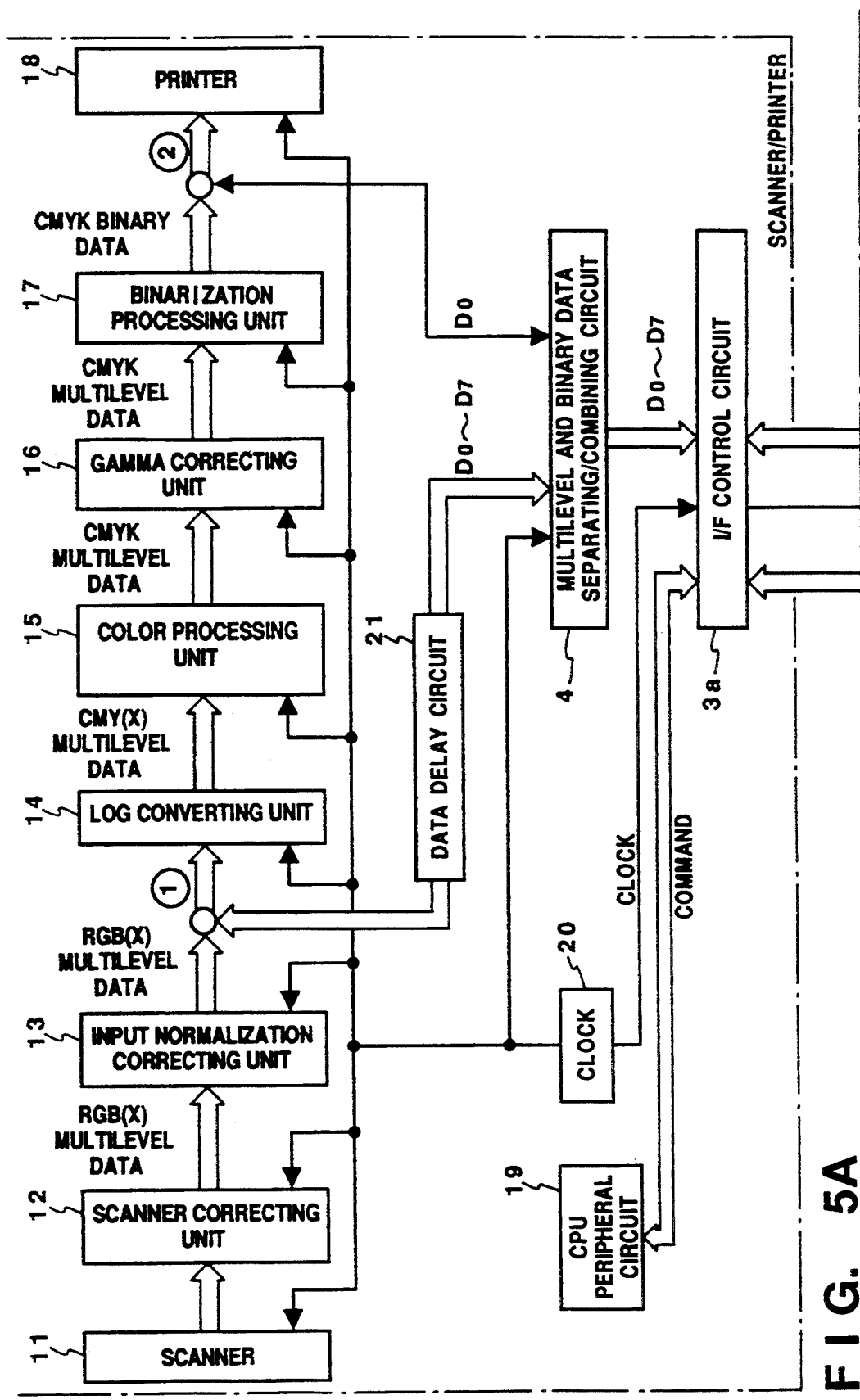
FIGS. 5A and 5B show a block diagram showing the system configuration of the first embodiment.
Figure 5B:
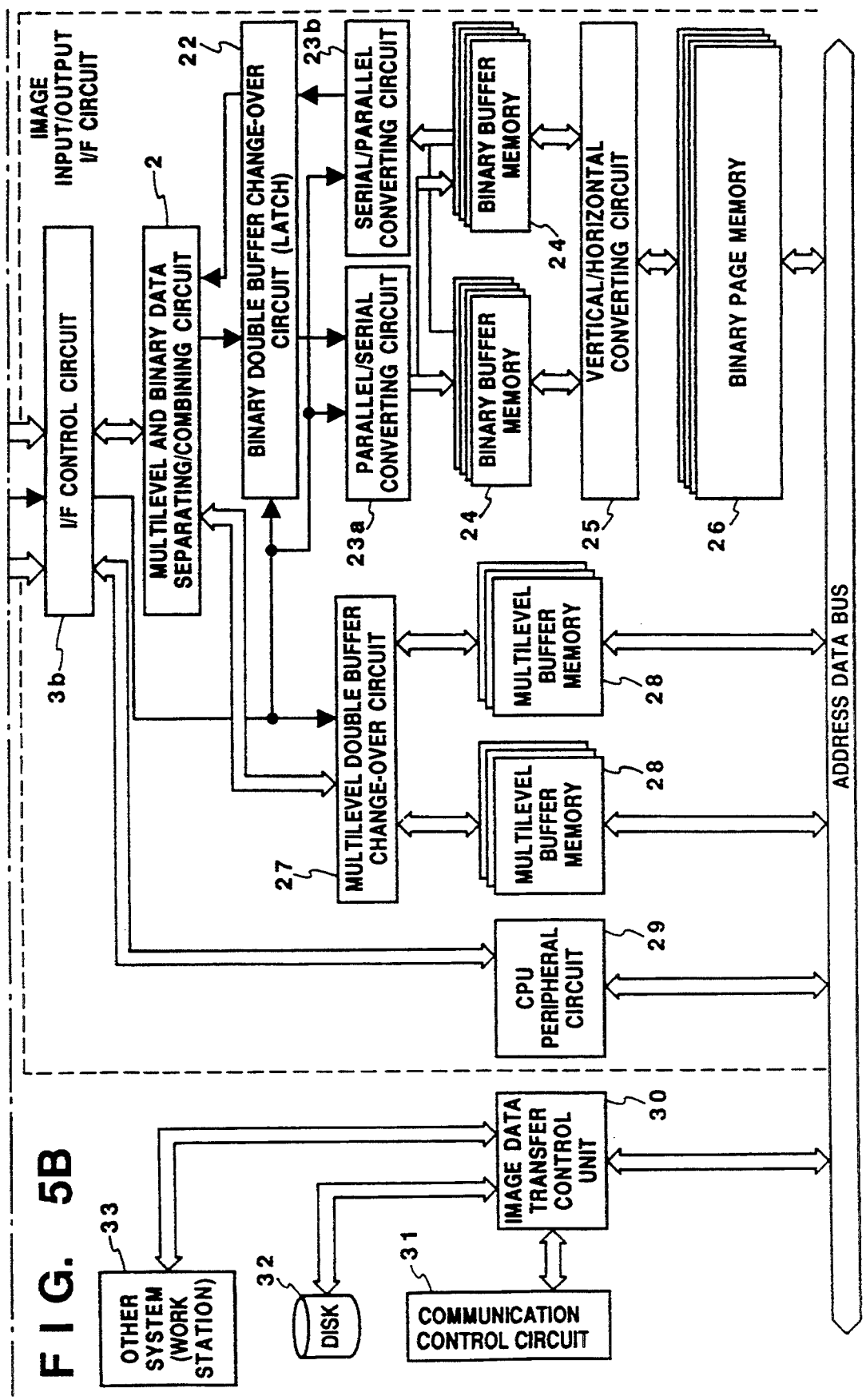
Figure 6:
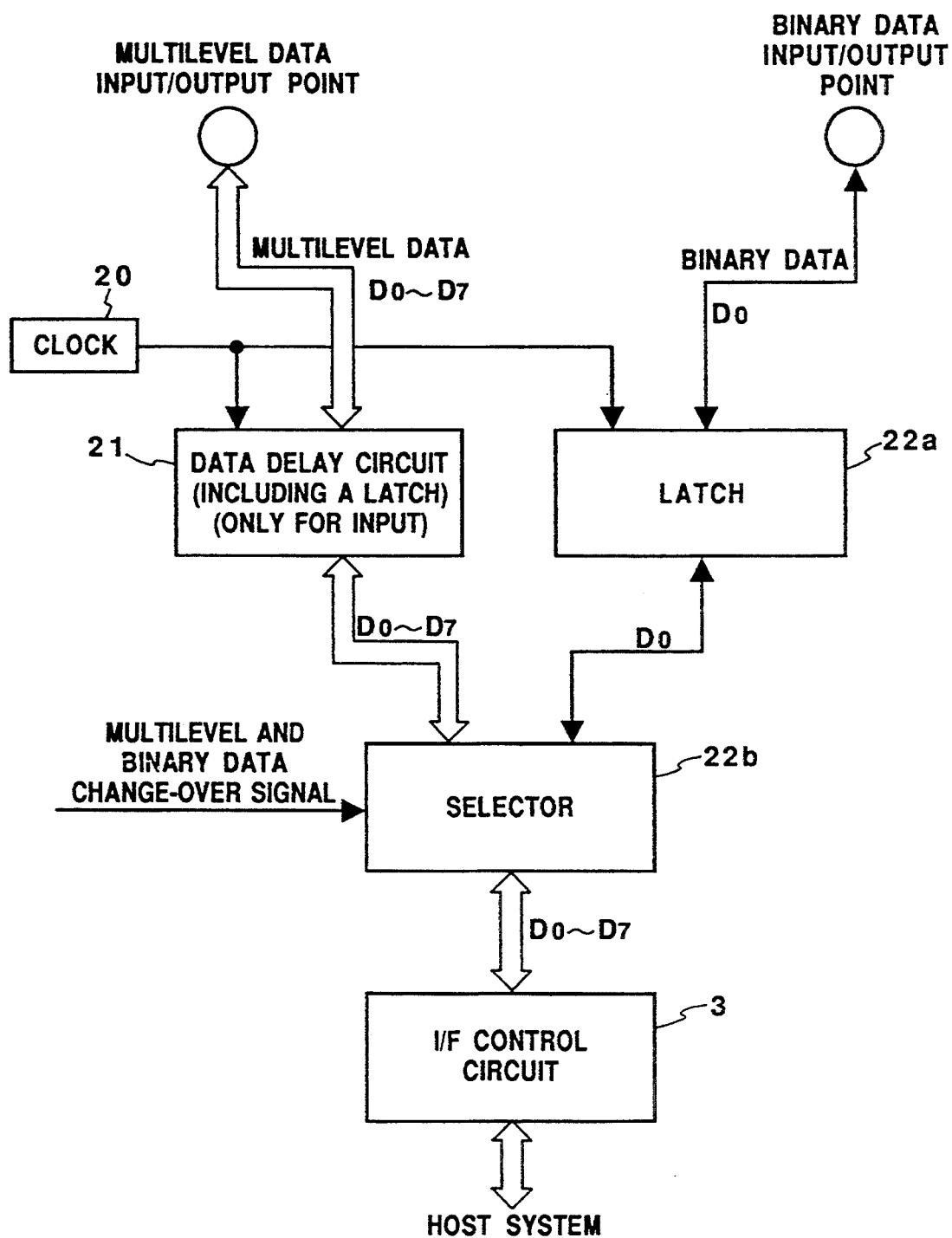
FIG. 6 is a block diagram of a multilevel and binary data separating/combining circuit 4 of FIGS. 5A and 5B.

FIGS. 5A and 5B show a block diagram of the first embodiment of the image interface according to the present invention. In this embodiment, the multilevel buffer memory 28 contains double buffers in order to eliminate the other time required when the memory is continuously used for a fixed period of time, as in the case of the video I/F, and thereby improves the memory access efficiency. That is, one buffer is used for inputting and outputting image data between the other system, such as a disk, a work station 33 or a communication control circuit 32, and the image interface device, and the other buffer is used for inputting and outputting image data between the scanner/printer and the image interface device.

Furthermore, the multilevel memory requires a very large memory capacity, and it is therefore difficult to provide a memory having the capacity which allows image data of one page to be stored. Hence, a buffer memory which is divided into blocks is prepared.

For the same reasons, the binary buffer memory 24 contains double buffers, because the memory capacity for binary image data is one eighth of that for multilevel image data and hence the binary page memory 26 can have the capacity which allows image data of one page to be stored, as shown in FIG. 5.

Figure 8:
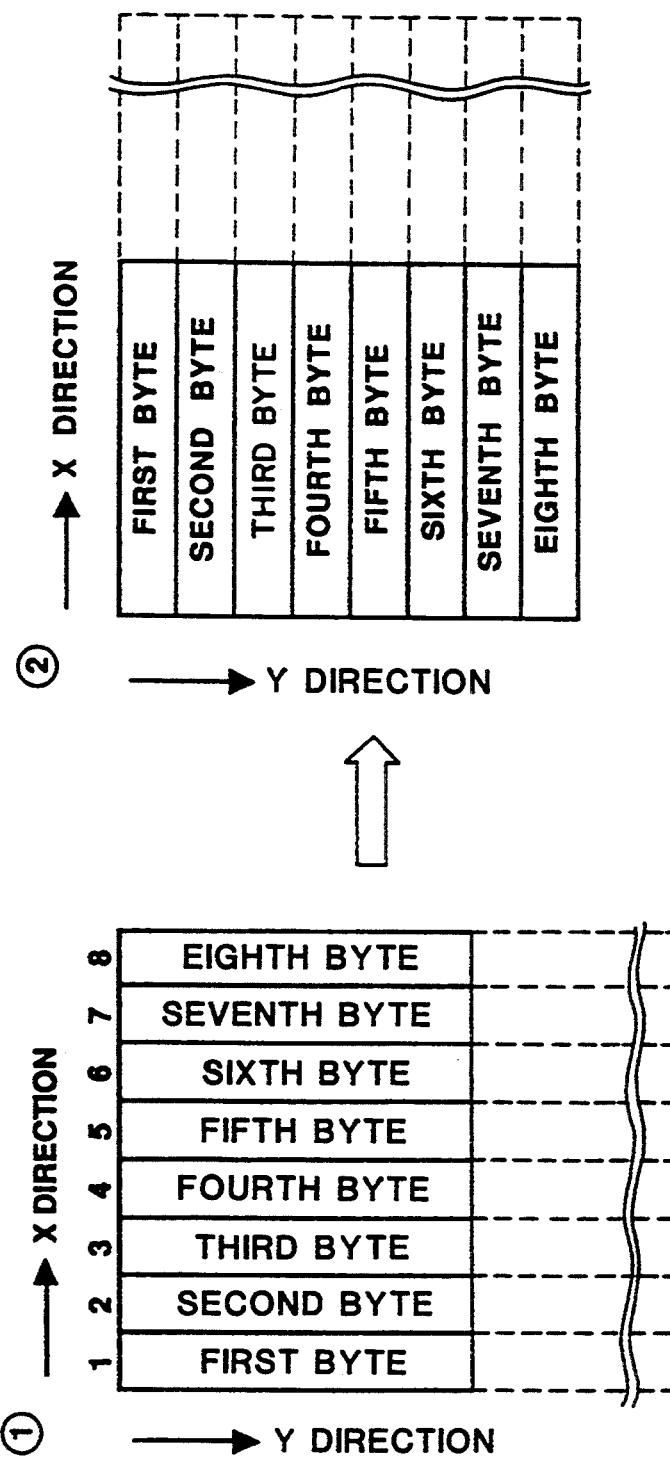
FIG. 8 illustrates the vertical/horizontal converting function.

Between the binary buffer memory 24 and the binary page memory 26 is a vertical/horizontal converting circuit 25. This circuit 25 is required when the scanner is of the serial scanning type, as indicated by ① of FIG. 4, and when the binary data is thus byte packed not in the x direction but in the y direction. FIG. 8 shows this vertical/horizontal converting function. When a serial scanning type scanner is used, since the pixels in the y direction are read in in sequence, they are byte packed in the memory in the manner indicated by ① of FIG. 8. However, this byte configuration indicated by ① of FIG. 8 is special and must be converted into the configuration indicated by ② of FIG. 8. This conversion is accomplished by the vertical/horizontal converting circuit 25.

Practically, a circuit for outputting the eight bytes sequentially inputted in the manner indicated by ① of FIG. 8 in the form indicated by ② of FIG. 8 is used. Consequently, the binary image data stored in the binary page memory is accessible in the raster direction.

The image data transfer control circuit 30 is a bus I/F for conducting UME bus I/E or channel control when it is a board inserted into a work station 33. The image data transfer control circuit 30 includes a disk controller when it is connected to a disk 32, or a control circuit for transferring image data to a communication circuit when it is connected to a communication control circuit 31.

The configuration shown in FIG. 5 is one example of the image interface device. The image data obtained through the I/F of the scanner/printer can be processed in a desired manner.

As stated above, the first embodiment is characterized in that the common data bus can be used to handle the multilevel and binary image data.

Figure 9:
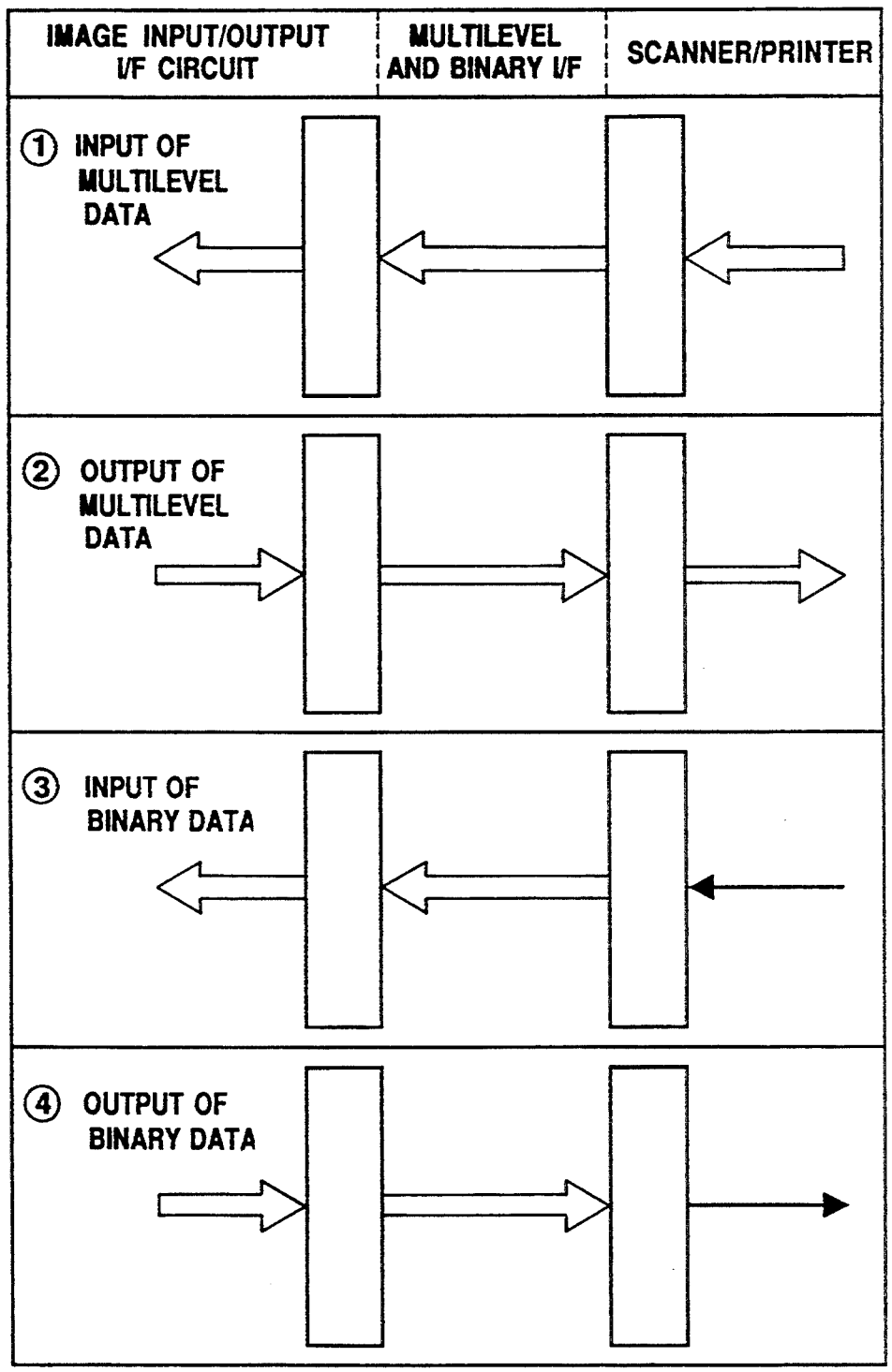
FIG. 9 shows the input/output modes of the first embodiment.

FIG. 9 shows examples of the input/output mode of the I/F in the first embodiment. As shown in FIG. 9, four input/output modes, including ① input of the multilevel data, ② output of the multilevel data, ③ input of the binary data, and ④ output of the binary data, are considered in the I/F of this embodiment. In these four modes, the same data bus is used for both the multilevel and binary image data.

According to the first embodiment, in the system for supplying to and receiving from the scanner/printer both the multilevel and binary image data, the least significant bit of the image data bus is used for both the multilevel and binary image data. Consequently, it is not necessary to provide two control systems, one for the multilevel image data bus and the other for the binary image data bus, and the I/F can thus be simplified, as stated above.

A second embodiment of the present invention will now be described with reference to FIGS. 10 to 15.

Figure 10A:
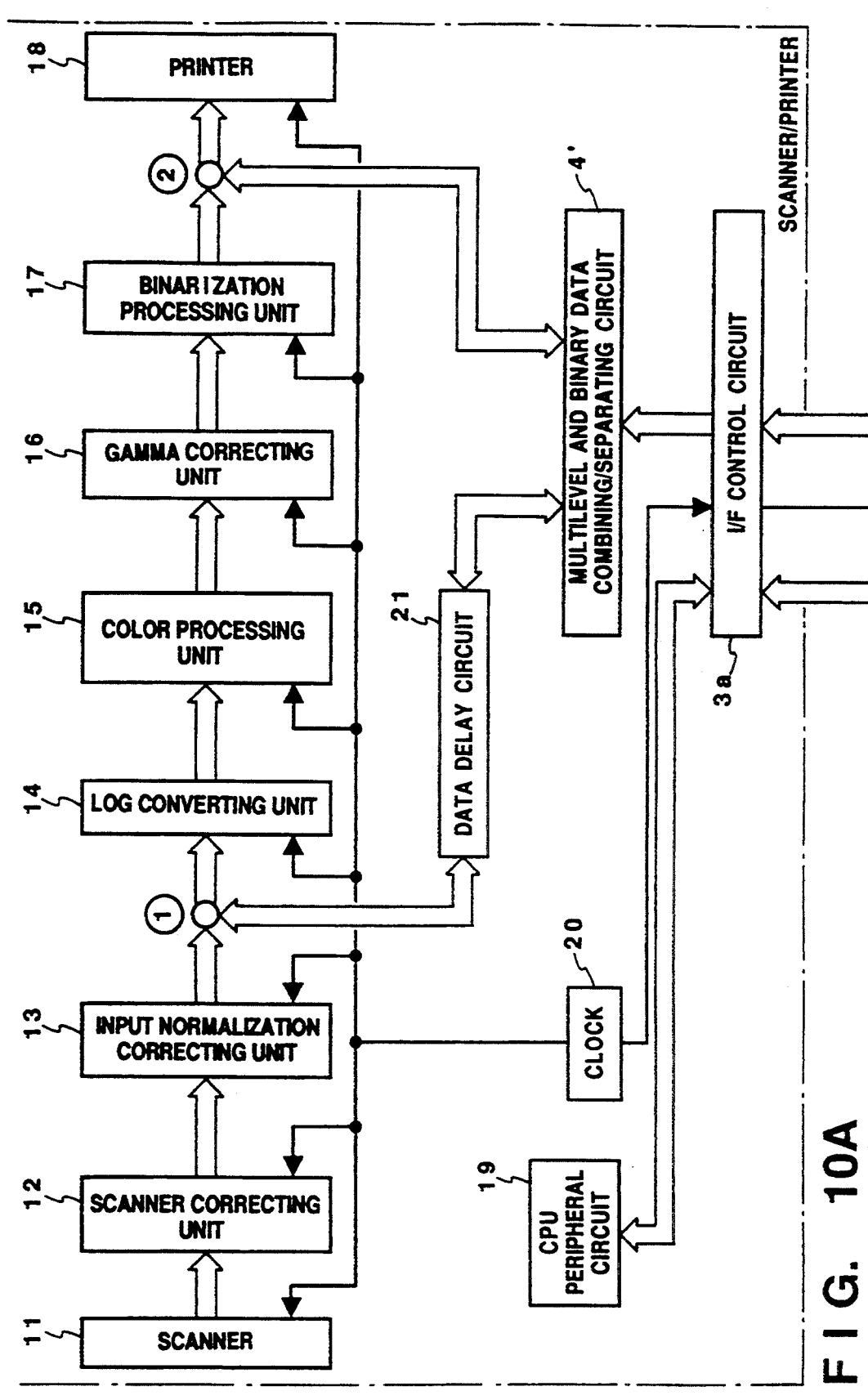
FIGS. 10 and 10B show a block diagram of a second embodiment of the present invention.
Figure 10B:
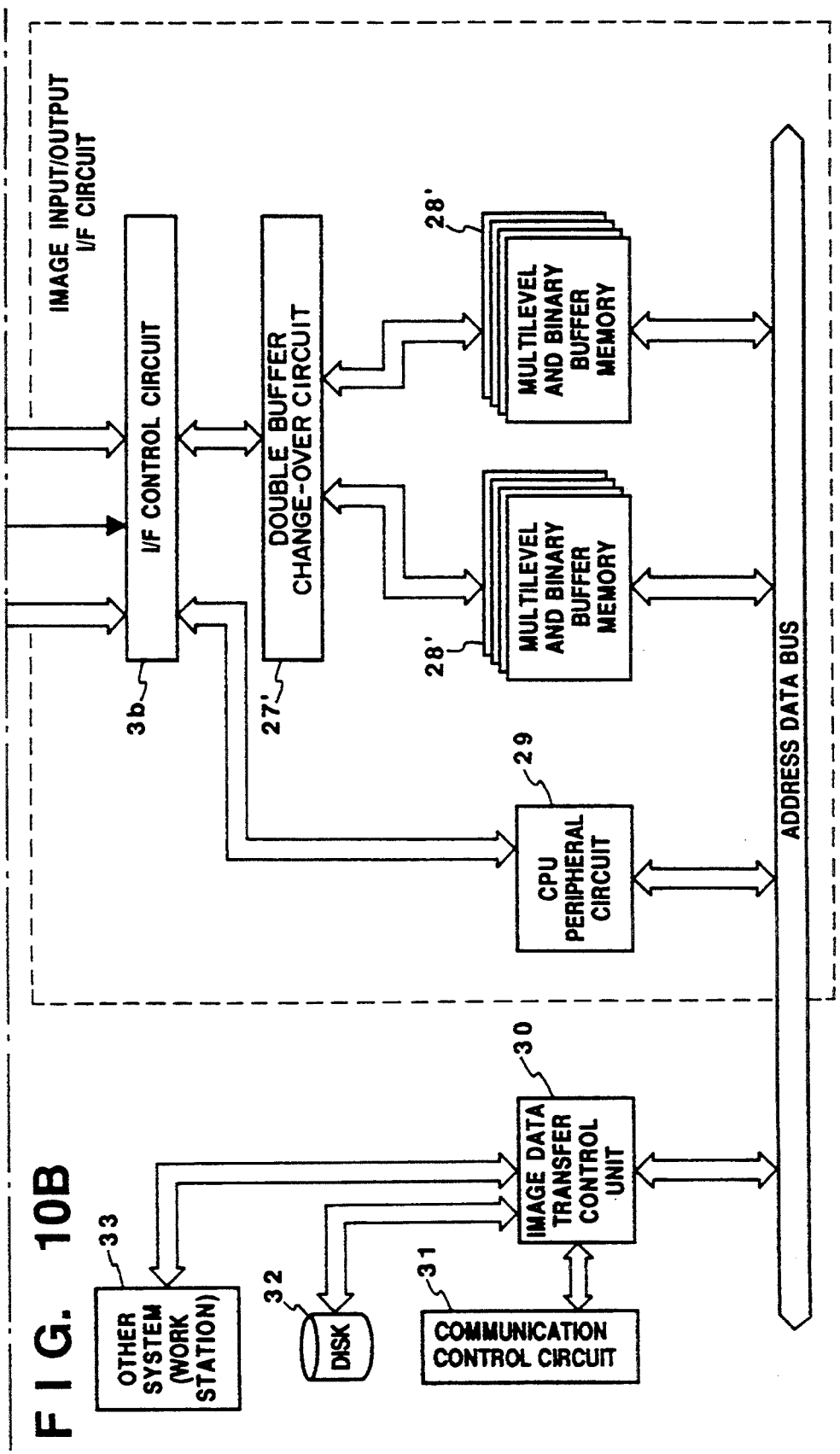

FIGS. 10A and 10B show the configuration of a second embodiment of the I/F device according to the present invention. In the image input/output I/F circuit shown in FIG. 10, the same buffer memories are used for both multilevel and binary data. That is, since the least significant bit 0, 1 of the multilevel image data does not greatly affect the multilevel data, the least significant bit of the multilevel data (1 byte) is defined as the binary image data. Consequently, the multilevel image data is read out from the buffer memories 28' when the buffer memories 28' are recognized as the multilevel memories, while the binary image data is read out when the buffer memories 28' are recognized as the binary memories. This is illustrated in FIG. 15. FIG. 12 shows the configuration of a multilevel and binary memory circuit.

Figure 13:
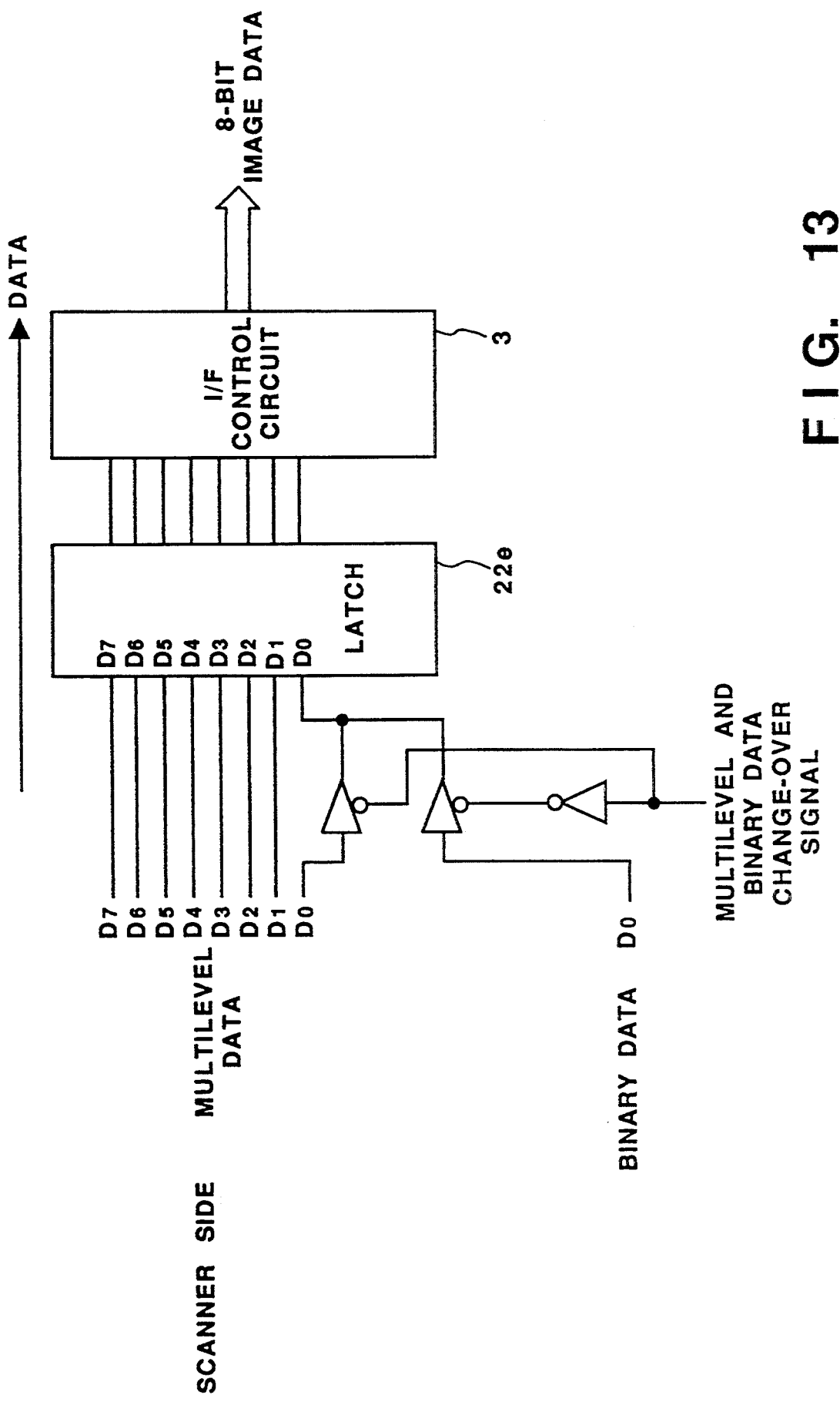
FIG. 13 illustrates how data is input.
Figure 14:
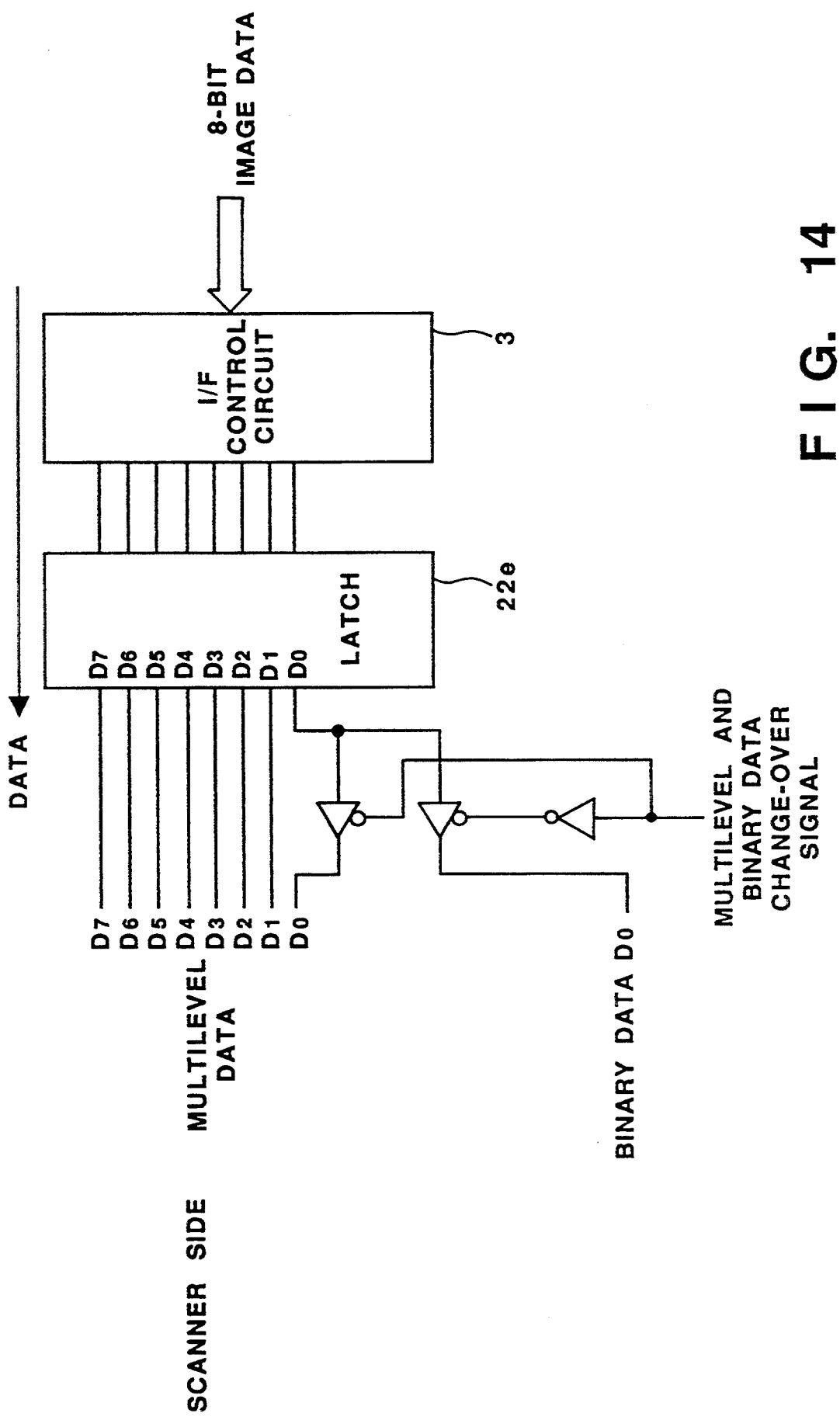
FIG. 14 illustrates how data is output.

On the side of the scanner/printer, a circuit for separating and combining the multilevel and binary data is required. FIG. 11 is a block diagram of such a separating and combining circuit. FIGS. 13 and 14 respectively show data is inputted and outputted at the separating and combining circuit.

In the structure shown in FIG. 11, when image data is sent from the scanner to the host system, the multilevel data is inputted to a data delay circuit 21a which includes a latch and which delays data only when the data is inputted. A selector 22d selects the least significant bit D0 from the binary data line when it combines the multilevel data with the binary data. Consequently, the I/F control circuit 3 inputs and outputs data obtained by combining the multilevel and binary data through the 8-bit data bus D0 to D7.

FIG. 13 is a circuit diagram when data is transferred from the scanner to the host system. As shown in FIG. 13, a binary and multilevel data change-over signal is used to change over output of the data between combined and multilevel states.

FIG. 14 is a circuit diagram when data is transferred from the host system to the scanner/printer. As in the case shown in FIG. 13, a binary and multilevel data changeover signal is used to change over output of the data between in a combined and multilevel states.

As stated above, according to the second embodiment of the present invention, the least significant bit of the multilevel image data is replaced by the binary image data. Consequently, storage of the multilevel image data assures the binary image data as well.

As will be understood from the foregoing description, in the second embodiment, the same interface is used commonly for the multi level and binary data. Consequently, the complicated structure of the interface can be simplified, and the optimum binary image data can be contained in the single multilevel image data. Hence, the use of two types of image data, multilevel and binary data, can be eliminated, and the capacity of the memory can thus be reduced.

Having described the invention as related to the embodiments shown in the accompanying drawings, it is our intention that the invention is not limited by any of the details of description, unless otherwise specified, but rather be constructed broadly within its spirit and scope as set out in the accompanying claims.

What is claimed is:

1. An image processing apparatus comprising:
   generating means for generating n-bit image data;
   processing means for processing the n-bit image data generated by said generating means and forming m-bit image data;
   outputting means for outputting the m-bit image data formed by said processing means; and
   image interface means for receiving and supplying n-bit image data from/to an external devices.
   wherein said image interface means further comprises:
      first interface means for receiving the n-bit image data from said generating means and the m-bit image data from said processing means and for supplying n-bit image data to said processing means and m-bit image data to said outputting means;
      second interface means for receiving the n-bit image data from the external device and for supplying the n-bit image data to the external device; and
      combination/separation means for combining the n-bit image data and the m-bit image data received by said first interface means so as to supply n-bit combined image data to the external device via said second interface means, and for separating the n-bit image data received from the external device via said second interface means so as to provide n-bit image data and m-bit image data to said first interface means.

2. An apparatus according to claim 1, wherein said generating means comprises a scanner which scans an image.

3. An apparatus according to claim 1, wherein said outputting means comprises a printer which prints an image.

4. An apparatus according to claim 1, wherein said second interface means receives and supplies the n-bit image data from/to a host system.

5. An apparatus according to claim 1, wherein said second interface means receives and supplies the m-bit image data through a common data bus.

6. An image processing apparatus comprising:
   generating means for generating n-bit image data;
   processing means for processing the n-bit image data generated by said generating means and forming m-bit image data;
   outputting means for outputting the m-bit image data formed by said processing means; and
   image interface means for inputting image data from an external device,
   wherein said image interface means further comprises:
      input interface means for inputting the n-bit image data input from the external device;
      separation means for separating the n-bit image data input from said input interface means into the n-bit image data and the m-bit image data, and
      output interface means for outputting the n-bit image data from said separation means to said processing means and the m-bit image data from said separation means to said outputting means.

7. An apparatus according to claim 6, wherein the n-bit image data is transmitted from the external device to said input interface means through a common bus line.

8. An apparatus according to claim 6, wherein said generating means comprises a scanner which scans an image.

9. An apparatus according to claim 6, further comprising storage means for storing the n-bit image data and the m-bit image data separated by said separation means, respectively.

10. An image processing apparatus comprising:
    generating means for generating n-bit image data;
    processing means for processing the n-bit image data generated by said generating means and forming m-bit image data;,
    outputting means for outputting the m-bit image data formed by said processing means; and
    image interface means for outputting the m-bit image data to an external device, wherein said image interface means further comprises:
 delay means for delaying the n-bit image data from said generating means during the same time period which is necessary to form the m-bit image data from the n-bit image data by said processing means;
 combination means for combining the n-bit image data delayed by said delaying means and the m-bit image data from said processing means and providing n-bit combined image data; and
 interface means for outputting the n-bit combined image data provided by said combination means to the external device.

11. An apparatus according to claim 10, wherein said generating means comprises a scanner which scans an image.

12. An apparatus according to claim 10, wherein said interface means outputs the n-bit combined image data to a host system.

13. An image processing apparatus comprising:
 generating means for generating n-bit image data;
 processing means for processing the n-bit image data generated by said generating means and forming m-bit image data;
 outputting means for outputting the m-bit image data formed by said processing means; and
 image interface means for outputting n-bit image data to an external device,
 wherein said image interface means further comprises:
 delay means for delaying the n-bit image data from said generating means during the same time period which is necessary to form the m-bit image data from the n-bit image data by said processing means;
 selection means for selecting either the n-bit image data delayed by said delay means or the m-bit image data from said processing means and providing selected image data in the form of the n-bit image data; and
 interface means for outputting the n-bit selected image data provided by said selection means to the external device.

14. An apparatus according to claim 13, wherein said generating means comprises a scanner which scans an image.

15. An apparatus according to claim 13, wherein said interface means outputs the n-bit selected image data to a host system.

* * * * *

UNITED STATES PATENT AND TRADEMARK OFFICE
CERTIFICATE OF CORRECTION

PATENT NO. : 5,438,648
DATED : August 1, 1995
INVENTOR(S) : MAKOTO TAKAOKA, ET AL.

It is certified that error appears in the above-indentified patent and that said Letters Patent is hereby corrected as shown below:

Column 1, line 11, "n bits" should read --n bits,--;
  line 12, "one" (second occurrence) should be deleted;

Column 2, line 49, "outputs" should read --output--.

Column 3, line 9, "a" should read --an--; and
  line 67, "KP" should read --PkP--.

Column 4, line 14, "tMP'=f(MP)" should read --MP'=f(MP)--; and
  line 27, "multi level" should read --multilevel--.

Column 6, line 39, "layer" should read --later--;
  line 43, "multi level" should read --multilevel--; and
  line 65, "multi level" should read --multilevel--.

UNITED STATES PATENT AND TRADEMARK OFFICE
CERTIFICATE OF CORRECTION

PATENT NO. : 5,438,648
DATED : August 1, 1995
INVENTOR(S) : MAKOTO TAKAOKA, ET AL.

It is certified that error appears in the above-indentified patent and that said Letters Patent is hereby corrected as shown below:

Column 7, line 7, "transferred" should read --being transferred--;
    line 9, "circuit 22a" should read --circuit 23a--;
    line 10, "transferred" should read --being transferred--;
    line 18, "an" should be deleted; and
    line 19, "other" should read --another--.

Column 8, line 13, "in in" should read --in--.

Column 9, line 31, "changeover" should read --change-over--;
    line 32, "in a" should be deleted;
    line 40, "multi level" should read --multilevel--; and
    line 62, "devices." should read --device,--.

Signed and Sealed this

Twenty-third Day of January, 1996

Attest:

BRUCE LEHMAN

*Attesting Officer*      Commissioner of Patents and Trademarks